G. E. MOLYNEUX.
POWER TRANSMITTER.
APPLICATION FILED JAN. 30, 1913.
1,223,603.
Patented Apr. 24, 1917.
2 SHEETS—SHEET 2.
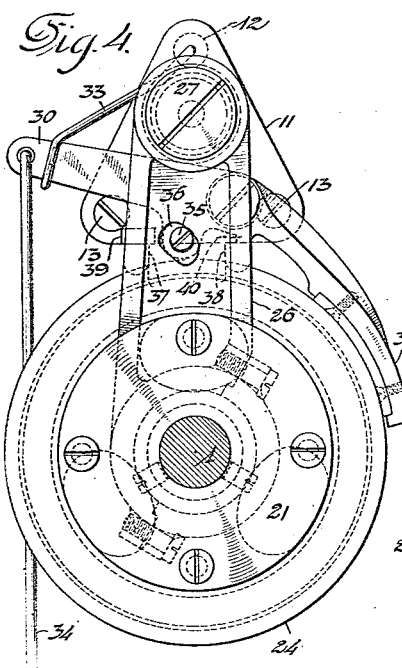
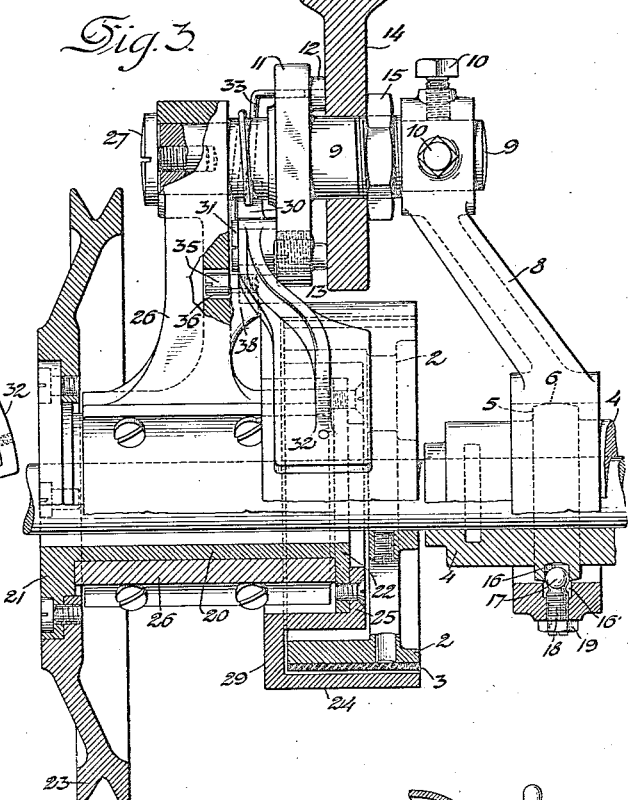
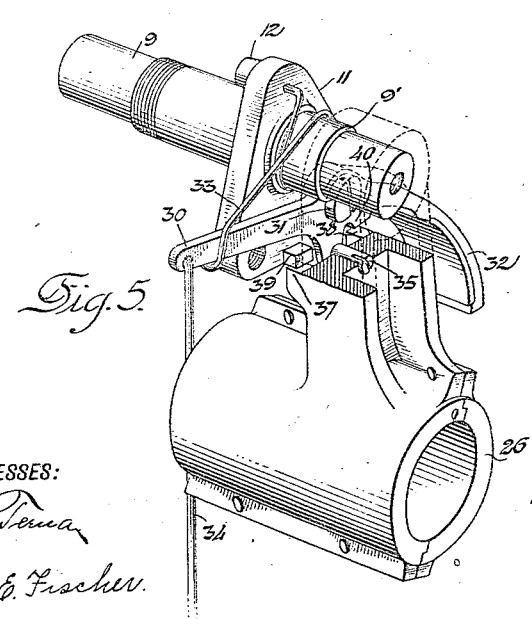
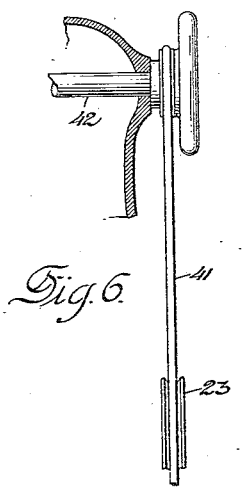
WITNESSES:
INVENTOR
George E. Molyneux
BY
Henry J. Miller
ATTORNEY under a federal reserve...

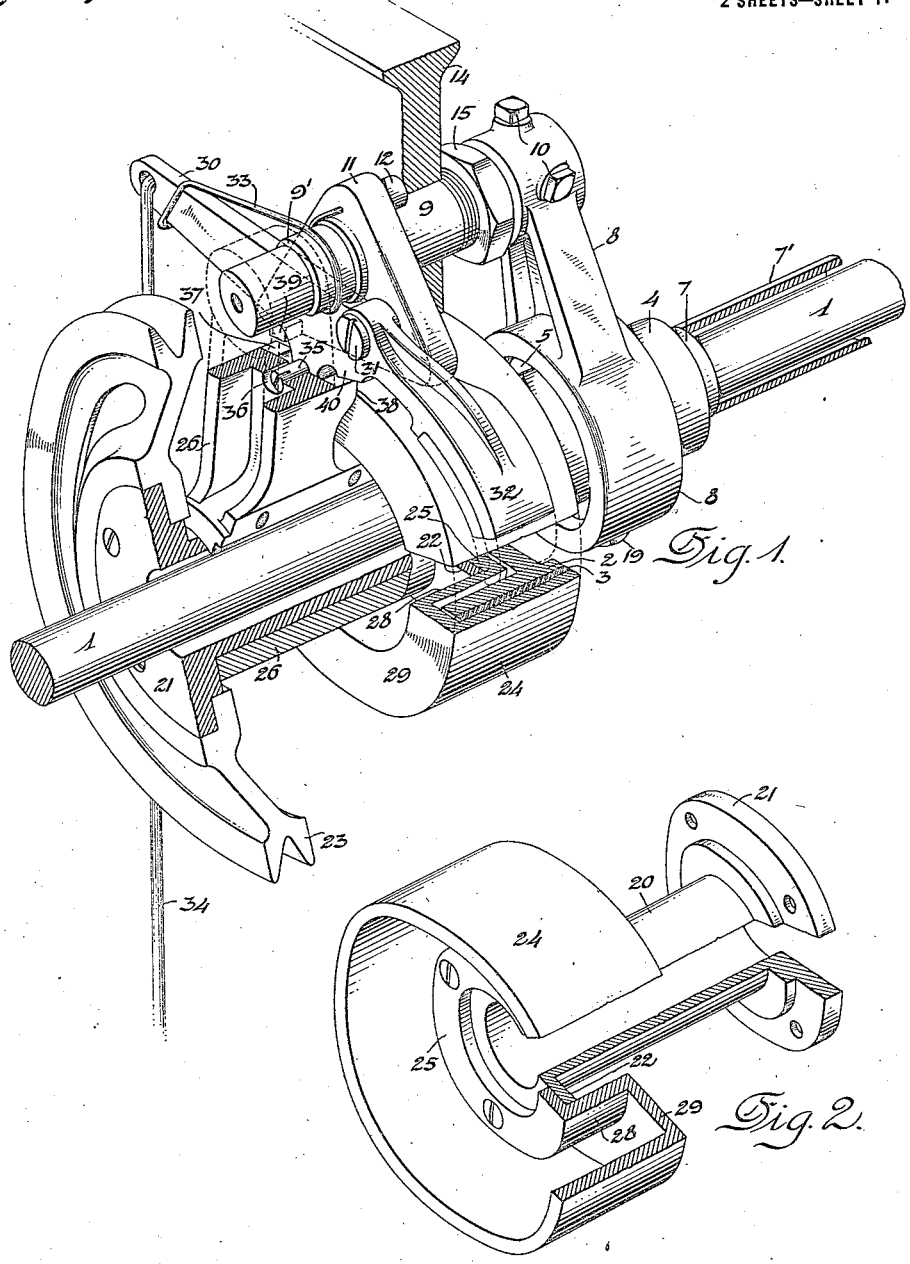

UNITED STATES PATENT OFFICE.

GEORGE E. MOLYNEUX, OF BAYONNE, NEW JERSEY, ASSIGNOR TO THE SINGER MANUFACTURING COMPANY, A CORPORATION OF NEW JERSEY.

POWER-TRANSMITTER.

1,223,603.  Specification of Letters Patent.  Patented Apr. 24, 1917.

Application filed January 30, 1913. Serial No. 745,079.

*To all whom it may concern:*

Be it known that I, GEORGE E. MOLYNEUX, a citizen of the United States, residing at Bayonne, in the county of Hudson and State of New Jersey, have invented certain new and useful Improvements in Power-Transmitters, of which the following is a specification, reference being had therein to the accompanying drawings.

My invention relates to a power transmitter, the particular form in which it is embodied being a friction clutch comprising a driving member fixed to a shaft driven by any suitable motor, and a driven member suspended by a hanger and adapted to be swung laterally into frictional engagement with the driving member.

The invention will be understood by reference to the accompanying drawings in which Figure 1 is a perspective view, with certain parts broken away, showing one embodiment of the invention; Fig. 2, a perspective view, partly cut away, of the driven member; Fig. 3, a front view, certain parts in central vertical section, of Fig. 1; Fig. 4, an end view looking toward the driven member with the belt surface removed; Fig. 5, a detailed perspective view showing the hanger for the driven member, the brake lever and other parts; and Fig. 6 a view showing the connection to the driven shaft. Similar reference numerals indicate similar parts in the several views.

Referring to the drawings the numeral 1 designates the driving shaft which is continuously rotated by a suitable motor. In practice this shaft may be of small diameter, the advantages of which are ease of maintaining alinement and less frictional load. Fixed on the shaft 1 is a driving member 2 in the form of a wheel or drum, the outer peripheral surface of which is covered with leather or other suitable material to constitute a friction engaging surface. The shaft 1 is supported in a bearing 4 having an enlarged circumferential section 5, the peripheral surface 6 of which is curved transversely on an arc struck from the center line of the shaft. The other end of the bearing 4 is reduced at 7 (Fig. 1) to receive a tube or covering cap 7' to prevent the operator coming in contact with the shaft 1. The bearing 4 is supported in a hanger 8 clamped on a stud-shaft 9 by set-screws 10. Integral with shaft 9, or made in a separate piece and fastened thereto, is a collar 11 which for convenience of manufacture may be triangular shaped. At the top of one side of said collar is a boss 12, and at its base two screws 13 which latter bear against the rail 14 through which the shaft 9 is passed. The rail 14 is a part of the support upon which the table or bench is laid, the machine to be driven by the transmitter being suitably placed on such table or bench. The shaft 9 is rigidly secured in position by a clamp-nut 15 adapted to bear against the side of the rail. To insure exact alinement of said shaft the screws 13, which also bear against the rail, may be tightened or loosened as necessary. It is essential that the stud-shaft 9 shall be parallel with the driving shaft 1.

As shown in Fig. 3 the enlarged circumferential section 5 of the bearing 4 is formed with a socket 16 adapted to receive a ball-stud 17 formed on the end of the screw 18 passing through an opening in the under side of the tubular portion of hanger 8. The screw 18 is secured in position by a check-nut 19. This ball-and-socket construction prevents endwise movement of bearing 4 but permits movement of said bearing to compensate for errors in alinement of shaft 1 by reason of the curvature of the enlarged section 5. Should the bearing 4 bind on the shaft 1 making it necessary to throw the transmitter out of action it may be readily done by loosening check-nut 19 and withdrawing the ball 17 into the enlarged inner portion 16' of the opening in hanger 8. This permits the bearing 4 to rotate freely in the bore of hanger 8. Where there are a number of transmitters on the shaft 1 this feature enables the operator to throw one transmitter out of action without affecting any other transmitter on the line.

The driven member comprises a sleeve 20 having end flanges 21 and 22, the shaft 1 passing through the central bore of said sleeve but entirely free from contact therewith as shown in Figs. 1, 3 and 4. Secured to flange 21 is a machine driving pulley 23, and secured to flange 22 is a drum 24 having a flange 25 by which it is fastened to the flange 22. It will thus be seen that the machine driving pulley 23 and drum 24 are rigidly secured together through sleeve 20. A suitable belt 41 is passed around pulley 23 and is connected up with the driven shaft 42. The driven member above described is supported in an angular split hanger 26, the tubular portion of which, see Fig. 5, embraces sleeve 20 between the end flanges 21 and 22. This hanger is pivotally hung on stud-shaft 9 and held thereon from endwise movement in one direction by the screw 27 and in the other direction by a shoulder 9' on said shaft.

The drum 24 is formed as shown in the drawings, that is, from the central flange 25 extends a cylindrical section 28 which surrounds the tubular portion of the split hanger 26. From said cylindrical section extends a web 29 connecting with the outer cylindrical or peripheral section of the drum, these parts forming a recess adapted to receive and surround the driving member 2. By extending the greater part of the driven drum 24 inside the plane of the end of the tubular portion of hanger 26, danger of cramping is lessened when transmitting power. Also the cup shape of the drum prevents the throwing off of any oil leaking between flange 22 and the end of the tubular portion of hanger 26. The internal diameter of the driven drum 24 is slightly greater than the outer diameter of the driving drum 2, the amount of clearance being sufficient to permit the driving member to run free when the driven member is in its normal position of rest.

Any suitable means may be provided to swing the driven member into frictional engagement with the driving member 2. A convenient means is to effect this movement through the brake-lever 30 pivoted at 31 on a stud fixed to the side of the collar 11. At its free end lever 30 is provided with a suitable brake-shoe 32 normally held in engagement with the periphery of drum 24 by a spring 33. Through a treadle connection 34 the brake may be released. In order to utilize the brake-lever as a means for moving the driven member 24 into frictional engagement with the driving member 2, I may employ any appropriate form of cam action or equivalent connection as for example a stud 35 attached to the side of said lever, said stud passing through an inclined elongated slot 36 in the web of hanger 26. When the outer end of lever 30 is depressed stud 35 bears against the lower wall of slot 36 thus swinging the hanger 26 forward and bringing the inner surface of the periphery of drum 24 into frictional engagement with the driving member 2. Theoretically, at any given instant of time, the inner contacting surface of drum 24 will engage the surface of the driving member at a single point. The surface of the driving member however being lined with leather or similar material, the pressure of the driven member against such surface will effect contact for a considerable distance about the periphery of the driving member. In practice the clearance between the driving and driven members is very slight, the movement to effect the engagement being hardly perceptible. The rotation of drum 24 is transmitted through sleeve 20 and flange 21 to the belt surface of pulley 23, and through the connection to shaft 42. When the treadle is released, spring 33 will return lever 30 to normal position, applying the brake to drum 24. The return movement of lever 30 will also move the drum 24 out of engagement with the driving member 2.

When the parts are in normal position, that is with the brake applied and the driving and driven members out of engagement with each other, it is desirable to prevent accidental engagement of the driving and driven members either by a forward or backward movement of the hanger. For this purpose, I provide two lugs 37 and 38 on the inside face of hanger 26. Coöperating with lug 37 is a lug 39 on the side of the fixed collar 11, and coöperating with lug 38 is a projection 40 on the under side of lever 30 directly below the pivot 31 (see Fig. 1). When in normal position, lugs 37 and 39 are in engagement with each other, and lug 39 being stationary or fixed it prevents movement of the hanger 26 backward, that is, it prevents movement in a direction opposite to that in which the hanger is moved by depressing the treadle. Also the lug 38 and projection 40 are in engagement with each other and projection 40 being fixed or stationary at such time will prevent the forward movement of hanger 26 and will hold the latter in its normal position, thus holding drum 24 in its normal or central position out of engagement with driving member 2. Should any part of the controlling mechanism, such as the treadle, pitman 34, or end of lever 30, break or get out of order, the drum 24 would swing by gravity to its normal or locked position.

As shown in Figs. 1, 3 and 5, the ribs of hanger 26 are reduced above the sleeve bearing or tubular portion of the hanger to permit the belt surface of pulley 23 to be set as near as possible the center line of the bearing to prevent any cramping action of the sleeve 20 on the hanger bearing 26. In other words there is no overhang of pulley 23, the belt surface being in a plane within the plane of the end of the hanger bearing 26. The dish shape of pulley 23 prevents the throwing off of oil leaking between flange 21 and the end of the tubular portion of hanger 26. The setting in of pulley 23 and drum 24 permits the connection 41 to be run close to rail 14. This is of advantage in that it makes a compact transmitter which may be so placed as to be out of interference by the operator.

In other words the construction permits the transmitter to be supported substantially central by the rail 14, thereby making available practically the entire space below the table for the operation of the machine.

Instead of a pulley 23 and belt connection to the driven shaft I may use a gear set rigidly with the driven member. Such construction is adapted more particularly however for low speeds.

The power transmitter herein described may be used for various purposes but has been used by me more particularly in connection with sewing machines. In practice, the line or main-shaft 1 extends beneath the power table upon which a number of machines are set up, each machine having its own transmitter, so that any one machine may be run without interference with the operation of any other. By reason of the peculiar construction of the bearing 4 and the manner of supporting it in hanger 8, movement of said bearing to compensate for errors in alinement of shaft 1 is permitted.

In its broad aspect my invention contemplates driving and driven members normally concentric with each other, with means to effect a relative movement between said members to move one of them to a position eccentric with and into frictional engagement with the other member, and I do not therefore desire to limit myself to the specific form of the members shown in the drawings, or to the specific means for bringing them into engagement with each other.

Having thus set forth the nature of the invention, what I claim herein is:—

1. In a power transmitter in combination, driving and driven members having coöperative curved surfaces maintained one within the other, a main driving shaft rotating about a fixed axis and passing through said driving and driven members, and means for moving the driven member transversely of the axis of said shaft to bring the same into engagement with the driving member while maintaining the parallelism of the axes of said members.

2. In a power transmitter in combination, a main driving shaft, a driving member on said shaft and held against bodily movement, a driven member surrounding and adapted to be passed through by said shaft, said members having complemental faces adapted to be brought into frictional engagement with each other, said faces being normally concentric with each other and with said shaft, and means to effect a relative movement between said members to move one of them to a position eccentric with the other and into frictional engagement therewith.

3. In a power transmitter in combination, a main driving shaft sustained in fixed position, a driving member fast on said shaft, a driven member normally concentric with and penetrated by the driving member, and means for moving said driven member to a position eccentric with the driving member and into frictional engagement therewith and for maintaining the parallelism of the members during such movement.

4. In a power transmitter, in combination, a main driving shaft, a driving member fast on said shaft and provided with a peripheral flange surrounding the same, a pivoted hanger surrounding the driving shaft, a driven member rotatably supported in said hanger and having its hub extending between the flange of the driving member and the driving shaft and encircling the latter, and means for moving the driven member laterally to bring the same into engagement with the driving member.

5. In a power transmitter, in combination, a main driving shaft, a driving member fast on said shaft fixed against lateral movement and provided with an annular friction face, a pivoted hanger surrounding the driving shaft, a driven member rotatably supported in said hanger, said driven member being normally concentric with the driving member and formed with an annular recess to receive the friction face of the driving member, and means for effecting a relative lateral movement between said members to bring the same into frictional engagement with each other.

6. In a power transmitter in combination, a main driving shaft, a driving member fast on said shaft, a driven member comprising a sleeve surrounding but out of contact with said shaft, a drum secured to said sleeve, a pivoted hanger in which said driven member is rotatably supported, and means for moving said hanger to thereby bring said drum into frictional engagement with the driving member.

7. In a power transmitter in combination, a main driving shaft, a driving member fast on said shaft, a driven member comprising a sleeve surrounding but out of contact with said shaft, said sleeve having a drum and a belt-pulley rigidly secured thereto, a pivoted hanger in which said driven member is rotatably supported, and means for moving said hanger to thereby bring the drum into frictional engagement with the driving member.

8. In a power transmitter in combination, a main driving shaft, a driving member fast on said shaft, a pivoted hanger, a driven member rotatably supported in said hanger, a spring pressed brake, a lever therefor, means including said lever for normally locking said driven member out of engagement with the driving member, and coöperating cam surfaces between said lever and hanger whereby when the lever is moved from normal position the driven member will be moved into frictional engagement with the driving member.

9. In a power transmitter, the combination with a driving-shaft and a driving-member carried thereby, of a pivoted hanger, a driven member rotatably supported by said hanger, a brake-shoe, a lever connected to said brake-shoe and adapted to move the same into and out of contact with the driven member, and a connection between said lever and the hanger whereby the movement of the lever to release the brake-shoe will effect a movement of the hanger to bring the driven member into engagement with the driving-member.

10. In a power transmitter, in combination, a main driving shaft, a driving member fast on said shaft and provided with an annular friction face, a pivoted hanger having a tubular bearing, a driven member comprising a drum rotatably supported in said bearing, said drum overlying the tubular portion of said hanger and provided with a recess to receive the friction face of said driving member, and means for imparting a lateral movement to said driven member to carry the same into engagement with the friction face of said driving member.

11. In a power transmitter in combination, a main driving shaft, a driving member fast on said shaft, a pivoted hanger, a driven member rotatably supported in said hanger, a lever for moving said hanger to bring the driven member into engagement with the driving member, and stops on said hanger adapted to coöperate with stops on a fixed part of the transmitter and on said lever to respectively prevent an accidental forward or backward movement of the driven member when in its normal position.

12. In a power transmitter in combination, a main driving shaft, a driving member fast on said shaft, a pivoted hanger, a driven member rotatably supported in said hanger, a lever for moving said hanger to bring the driven member into engagement with the driving member, stops on said hanger adapted to coöperate with a stop on a fixed part of the transmitter and a stop on said lever to prevent an accidental forward or backward movement of the driven member when in its normal position, and a brake device so connected to said lever as to be automatically applied to the driven member when the lever is released.

13. In a power transmitter, the combination with a driving-shaft and a driving-member fixed upon said shaft, of a driven member encircling said shaft and adapted to engage the driving-member, a swinging hanger for said driven member, an adjustable hanger for the driving-shaft, a common supporting member for each of said hangers consisting of a short shaft adapted to be clamped upon the frame of a power table, and means for moving the driven member into and out of contact with the driving-member.

14. In a power transmitter, in combination, a pivoted hanger provided with a tubular bearing, a driven member comprising a drum supported by said bearing and provided with a belt-pulley, said drum and belt pulley overlying the bearing, a driving shaft, a driving member fast on said shaft and overlying said tubular bearing, a fixed hanger for said driving shaft, a common supporting shaft for said hangers, and means for moving the driven member into engagement with the driving member.

In testimony whereof, I have signed my name to this specification, in the presence of two subscribing witnesses.

GEORGE E. MOLYNEUX.

Witnesses:
H. A. KORNEMANN, Jr.,
W. P. STEWART.